June 6, 1961

P. M. CUPIDO ET AL 2,986,935

RADIATION PYROMETER

Filed Dec. 18, 1953

INVENTORS
PIET MARINUS CUPIDO
WILHELMUS JACOBUS MARIE
VAN GERWEN
BY

AGENT

United States Patent Office 2,986,935
Patented June 6, 1961

2,986,935
RADIATION PYROMETER
Piet Marinus Cupido and Wilhelmus Jacobus Marie van Gerwen, Emmasingel, Eindhoven, Netherlands, assignors, by mesne assignments, to North American Philips Company, Inc., New York, N.Y., a corporation of Delaware
Filed Dec. 18, 1953, Ser. No. 399,113
Claims priority, application Netherlands Dec. 23, 1952
5 Claims. (Cl. 73—355)

The invention relates to a radiation pyrometer. Radiation pyrometers are in general used for measuring temperatures of more than 800 to 900° C. They frequently comprise a plate onto which an image of the source of heat, the temperature of which is to be measured, is projected by means of an optical system and which is connected to a thermo-electric couple in a manner such that its one weld or hot junction assumes approximately the temperature of the plate, the other weld or cold junction assuming the ambient temperature of the body temperature of the pyrometer. In measuring temperatures, the effect of ambient temperature must be taken into consideration. Various methods have been used for compensating the influence of the ambient temperature. The compensation may be carried out, inter alia by means of temperature-dependent resistors, connected in parallel or in series with the thermo-electric couple. The invention provides a different method in which substantially complete compensation is obtained.

For a better understanding of the problem and solution of the invention, reference is had to the accompanying drawing, in which.

If by means of an optical system an image of the source of heat is projected into a collecting plate, the relationship between the temperature assumed by the plate, the temperature of the source and the ambient temperature may be represented by $$T_p^4 = \frac{0.85 \Phi B \cdot \sin^2 \theta}{1+e} \cdot T_B^4 + T_0^4$$

wherein $T_p$ designates the temperature of the plate in degrees K., $T_B$ the temperature of the source in degrees K., $T_0$ the ambient temperature in degrees K., $\Phi B$ the fraction of the radiation not absorbed by the optical system and the glass envelope of the device and contributing to the image on the plate, $\theta$ half the angular aperture of the optical system and $e$ the absorption coefficient of the rear side of the collecting plate.

It is assumed herein that the source of radiation is a black body, the front of the plate is a substantially black body, the glass envelope is well exhausted and the transfer of heat along the supply wires of the thermo-electric couple is negligible with respect to the loss of radiation of the collecting plate.

Figure 1:
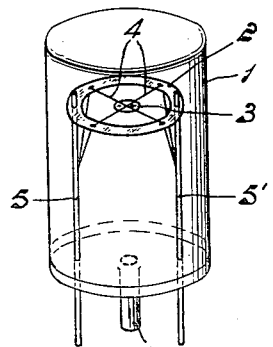
FIG. 1 shows a typical thermo-electric couple for a radiation pyrometer.

FIG. 1 shows one embodiment of a typical thermo-electric couple comprising a collecting plate in a glass envelope, which may be used in the pyrometer according to the invention. The glass envelope is designated by 1. The plate 3, onto which an image of the source of heat is projected by an optical system, is connected to the wires 4 of the thermo-electric couple. These wires are taken through holes in a mica ring 2, supported by two through-connection conductors 5 and 5'. By securing the wires of the thermo-electric couple not to the upper ends of the conductors 5 and 5' but to points lying lower, the loss due to conduction may be reduced. Reference numeral 6 designates an exhaust tube.

Figure 2:
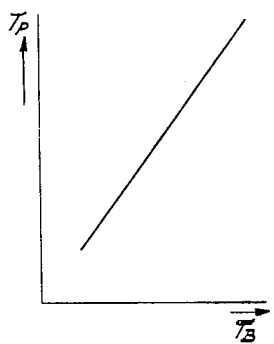
FIG. 2 is a graph showing the relationship between the thermo-couple plate temperature and the source temperature.

The value $\Phi B$ is not constant, it increases with the temperature of the source. With a correct choice of this value and of the angular aperture of the optical system the relationship between $T_p$ and $T_B$ becomes linear in the case of a given ambient temperature, which is an important advantage of the apparatus described over many other radiation pyrometers. FIG. 2 shows the relationship between the temperature of the source and the temperature of the plate.

Figure 3:
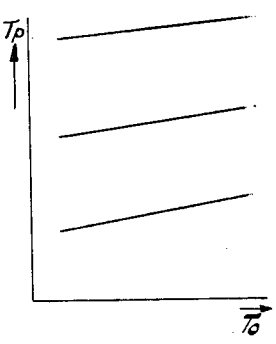
FIG. 3 is a graph showing the relationship for several different source temperatures between the plate temperature and ambient temperature.

The influence of the ambient temperature is evident from FIG. 3. Between 20° and 100° C. the relationship between $T_0$ and $T_p$ is found to be substantially linear, if the temperature of the source is constant. This figure shows the relationship between the temperature of the plate and the ambient temperature for three different values of the temperature of the source.

It appears therefrom that, if the influence of the ambient temperature is to be compensated, the degree of the effect serving this purpose must be completely determined also by the temperature to be measured, in a manner such that this effect must be lower for higher temperatures of the source than for lower temperatures thereof, since the slope of the graph indicating the relationship between the values $T_p$ and $T_0$ is materially less steep for higher temperatures of the source than for lower temperatures.

According to the invention, the circuit of the first thermo-electric couple has introduced into it, by means of a second thermo-electric couple, a compensation voltage, which varies both with the ambient temperature and the temperature to be measured.

It should be noted that it is known with thermo-electric couples intended for direct measurement of a temperature, in which the hot weld is in direct equilibrium with the temperature to be measured, to use a second thermo-electric couple for compensating the error of the cold weld. The compensation method according to the invention is not a compensation of the cold weld; the latter will, in general have to be carried out in addition.

For the first-mentioned compensation, the second thermo-electric couple may, in accordance with the invention, be arranged in the proximity of the first couple, so that a voltage is obtained varying with the ambient temperature. This voltage is introduced wholly or partly into the circuit for the measuring instrument by means of a potentiometer, provision being made of means to render the adjustment of the potentiometer dependent on the temperature to be measured. Use is preferably made of another potentiometer, at which a constant voltage is operative and the sliding contact of which is moved by a servo-motor in common with a sliding contact of the first-mentioned potentiometer, the supply voltage of the servo-motor varying with the potential difference between the two sliding contacts, the potentiometers being included in a circuit in which a voltage derived from the first thermo-electric couple is operative.

It may thus be ensured that the position of each of the sliding contacts is indicative of the temperature of the source.

Figure 4:
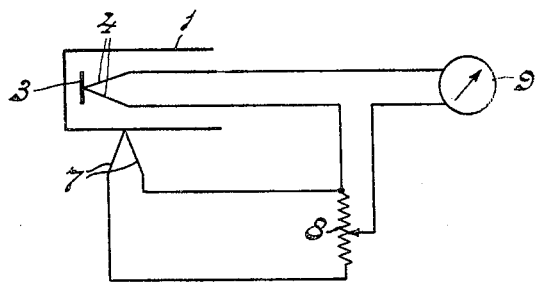
FIG. 4 is a schematic illusrtation of an embodiment of the inventon.

FIG. 4 serves to explain the invention. In this figure reference numeral 1 designates the envelope of the thermo-electric couple. With the aid of this couple the temperature of the plate 3, onto which an image of the source of heat is projected, is measured. It is assumed that the plate 3 is arranged in the manner shown in FIG. 1; its side onto which the image is projected is preferably blackened, its other side being polished or made reflective. One conductor of the thermo-electric couple 4 may be connected directly to the measuring instrument 9 and the other to a potentiometer 8, to the ends of which a second thermo-electric couple 7 is connected. The latter is arranged at the area of the envelope 1 of the first thermo-electric couple and thus supplies a voltage which varies in the desired manner with the temperature of the envelope 1, if a known cold-weld compensation is carried out. The other terminal of the measuring instrument 9 is connected to a movable contact of the potentiometer 8. If provisions are made that, by means of a device (not shown) the position of the contact of the potentiometer 8 varies in the correct manner with the temperature of the source, the measuring instrument 9 will provide a substantially accurate indication of the temperature to be measured. From FIG. 3 it is evident that the compensation voltage to be introduced into the circuit of the instrument 9 must be lower, the higher the temperature of the source. Provisions are therefore to be made that at higher temperatures a smaller portion of the potentiometer 8 should be included in the circuit of the measuring instrument than at lower temperatures.

Figure 5:
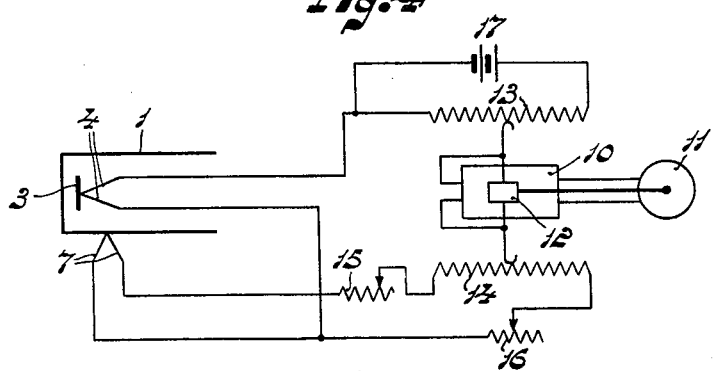
FIG. 5 is a schematic illustration of another embodiment of the invention which performs automatically.

FIG. 5 shows one embodiment of a device according to the invention, constructed along the lines of an automatically-balancing, D.-C., null-type potentiometer, measuring apparatus. It comprises two potentiometers 13 and 14, the first of which includes a resistive element connected to a direct-voltage source 17 of constant voltage, the second also including a resistive element fed via variable resistors 15 and 16 by a thermo-electric couple 7, providing a voltage varying with the temperature of the direct ambience of the thermo-electric couple 4. The latter is connected between the current conductor of the thermo-electric couple 7 leading to the resistor 16 and the circuit of the potentiometer 13. The sliding contacts of the two potentiometers are interconnected by a mechanical device 12, which may be actuated by a servo-motor 11. The sliding contacts are connected to an electric D.-C. amplifier 10, in which the potential difference between these two contacts is amplified. The servo-motor 11 is fed by the output voltage of the amplifier 10. The motor 11 displaces the sliding contacts in a sense such that the voltage between the sliding contacts becomes lower until it reaches zero value. In other words, a predetermined portion of the voltage output of the thermocouple 7 is selected to be added to the voltage output of the thermocouple 4, and these two added voltages are balanced against the portion of the voltage at 17 selected by the potentiometer 13. At balance, zero voltage difference exists between the two sliding contacts of the potentiometers 13 and 14.

Thus a compensation according to the invention is obtained; the position of the sliding contacts are indicative of the temperature of the source. It is obvious that the degree of compensation varies not only with the voltage produced by the thermo-electric couple 7, but also with the voltage of the thermo-electric couple 4. That is to say, as the voltage output of the thermocouple 4 changes, indicating a change in the source temperature, a new balance will be struck at the sliding contacts by their taking up a new position, which means that a different portion of the output voltage of the thermocouple 7 is operative in the circuit. Thus, the quantity of compensating voltage introduced into the circuit is dependent upon the temperature of the source.

With the aid of the resistors 15 and 16 the correct adjustment of the initial values and the final values of the compensation voltage may be obtained.

What is claimed is:

1. A radiation pyrometer comprising a first thermocouple producing a first voltage responsive to radiation from a source of heat, means coupled to said first thermocouple and forming a circuit therewith and responsive to a voltage, a second thermocouple producing a second voltage responsive to ambient temperature, and means interconnecting said circuit and said second thermocouple for introducing into said circuit a portion of said second voltage correlated to the temperature of said source of heat to completely compensate for the effect of the ambient temperature.

2. A radiation pyrometer comprising a first thermocouple producing a first voltage responsive to radiation from a source of heat at a given temperature, means coupled to said first thermocouple and forming a circuit therewith and responsive to a voltage, a second thermocouple producing a second voltage responsive to ambient temperature, and means responsive to said given temperature interconnecting said second thermocouple and said circuit for introducing into the latter a portion of said second voltage dependent upon the value of said given temperature.

3. A radiation pyrometer comprising a first thermocouple producing a first voltage responsive to radiation from a source of heat at a given temperature, means coupled to said first thermocouple and forming a circuit therewith and responsive to a voltage, and means compensating for the effect of said ambient temperature, said compensating means including a second thermocouple responsive to ambient temperature and producing a second voltage and a controllable impedance for introducing into said circuit a portion of said second voltage whose value is directly proportional to ambient temperature and inversely proportional to said given temperature of said source, whereby complete compensation for the effect of said ambient temperature is accomplished.

4. A radiation pyrometer as set forth in claim 3 wherein the compensating means is automatically responsive to said given temperature to introduce the correct valve of said second voltage into said circuit.

5. A radiation pyrometer comprising a first thermocouple responsive to radiation from a source of heat, a first potentiometer including a resistive element and a contact movable thereon, a source of D.-C. potential connected across said resistive element of the first potentiometer, a second thermocouple responsive to ambient temperature, a second potentiometer including a resistive element coupled across said second thermocouple and having a contact movable thereon, said movable contacts of said potentiometers being coupled to move together, means electrically connecting said first thermocouple between points on the resistive elements of both said first and second potentiometers, said D.C. source and thermocouples being polarized so that the voltages produced at said movable contacts will be balanced at predetermined positions along their respective resistive elements as determined by the temperature of said source of heat, and automatic means coupled to both movable contacts of the potentiometers and responsive to a potential difference between the said contacts for jointly moving them to positions at which the said potential difference is made equal to zero.

References Cited in the file of this patent

UNITED STATES PATENTS

| 1,553,789 | Moeller | Sept. 18, 1925 |
| 2,357,193 | Harrison | Aug. 29, 1944 |
| 2,635,468 | Field et al. | Apr. 21, 1953 |
| 2,696,117 | Harrison | Dec. 7, 1954 |
| 2,672,465 | Goodman et al. | Mar. 30, 1954 |

FOREIGN PATENTS

| 640,711 | Great Britain | July 26, 1950 |

UNITED STATES PATENT OFFICE
CERTIFICATE OF CORRECTION

Patent No. 2,986,935　　　　　　　　　　　　　　　June 6, 1961

Piet Marinus Cupido et al.

It is hereby certified that error appears in the above numbered patent requiring correction and that the said Letters Patent should read as corrected below.

Column 2, line 27, strike out "completely" and insert the same after "to be" in line 26, same column; column 4, line 39, for "valve" read -- value --.

Signed and sealed this 28th day of November 1961.

(SEAL)
Attest:

ERNEST W. SWIDER
Attesting Officer

DAVID L. LADD
Commissioner of Patents

USCOMM-DC